UNITED STATES PATENT OFFICE.

CALEB CLIFFORD, OF GLOVERSVILLE, NEW YORK.

PROCESS OF PREPARING FERTILIZERS.

SPECIFICATION forming part of Letters Patent No. 434,977, dated August 26, 1890.

Application filed August 2, 1889. Serial No. 319,589. (No specimens.)

*To all whom it may concern:*

Be it known that I, CALEB CLIFFORD, a citizen of the United States, residing at Gloversville, in the county of Fulton and State of New York, have invented certain new and useful improvements in reducing the hereinafter-named refuse into a soluble condition and manufacturing the same into a commercial fertilizer—viz., the refuse of skin-mills, known as "hair," "pates," "fleshing," and "frizzing;" the refuse of leather-finishing shops, known as "finishing-dust" or "leather-dust;" the refuse of glove and mitten shops, known as "leather scrap," "fur scraps," and "trimmings;" and I do hereby declare that the following is a full, clear, and exact description of the invention, which will enable others skilled in the art to which it appertains to make and use the same.

Heretofore the above-named refuse has been considered valueless, owing to the prevailing belief that it is almost insoluble, in some instances taking six or seven years to decompose it.

The object of my invention is to dissolve this refuse by such methods that are inexpensive, practical, and economical, so that all its fertilizing properties will be retained, in which condition it is a very rich and powerful fertilizer.

The discovery of the fermentation process is the result of many and varied experiments conducted solely by myself and extending over a period of more than three years.

To carry my invention into effect, I collect the refuse and take it to some suitable locality. If too dry, I dampen it with water, then place it in a heap. (The larger the heap the better.) In a short time the refuse begins to sweat, and if heat enough is generated by this sweating process putrefactive fermentation will ensue. Should it fail to ferment spontaneously, I increase the heat in the heap by putting in a little quicklime. Any non-burning heat-producer will answer the purpose. If conveniently near a furnace or boiler, the heat from steam-pipes, hot-water pipes, or hot-air pipes will do equally well. When fermentation has begun, it rapidly goes through the mass. When necessary, I cover the heap with slaked lime, earth, or other matter to retain the heat and moisture and prevent the escape of ammonia. This covering is only necessary after the refuse has begun to dissolve. With lime frizzings no covering is needed. When fermentation subsides, the heap is opened and turned to allow the air (a very important agent) to circulate among the refuse. The heap is again closed, sweated, and fermented, as before described. The opening, turning, resweating, and refermentation are repeated until all efforts to produce further fermentation fail, which is not until the refuse has become dissolved and soluble. The time required for each course of fermentation is about thirty days. The number of courses necessary varies from three to six, depending upon the condition of the refuse when first placed in the heap, and also atmospheric changes. When all is ready, the heap is finally opened, dried, then ground in a mill or run through a screen or sieve, then put into bags or barrels, and is then ready for market.

I am aware that prior to my invention the above-named refuse has been used as a fertilizer in a crude state; and I am also aware that leather has been subjected to the action of steam and then dried and ground.

What I claim, and desire to secure by Letters Patent, is—

The process of preparing fertilizer from refuse leather, the same consisting in dampening refuse leather and placing it in a heap, so as to allow it to undergo a natural sweating or fermentation, and when sweating or fermentation subsides opening the heap and turning over the compost to allow the air to circulate freely therethrough, then closing the heap and allowing it to sweat again, and repeating the operation of opening and closing the heap and sweating the compost as long as fermentation lasts, the resulting product being either ground or passed through a sieve to make a merchantable article, as set forth.

CALEB CLIFFORD.

Witnesses:
JAMES MILLER,
PAUL HANNIG.